Dec. 29, 1970  U. TSAO  3,551,096
PREPARATION OF SODIUM CARBONATE FROM SODIUM AMALGAM
Filed March 14, 1968
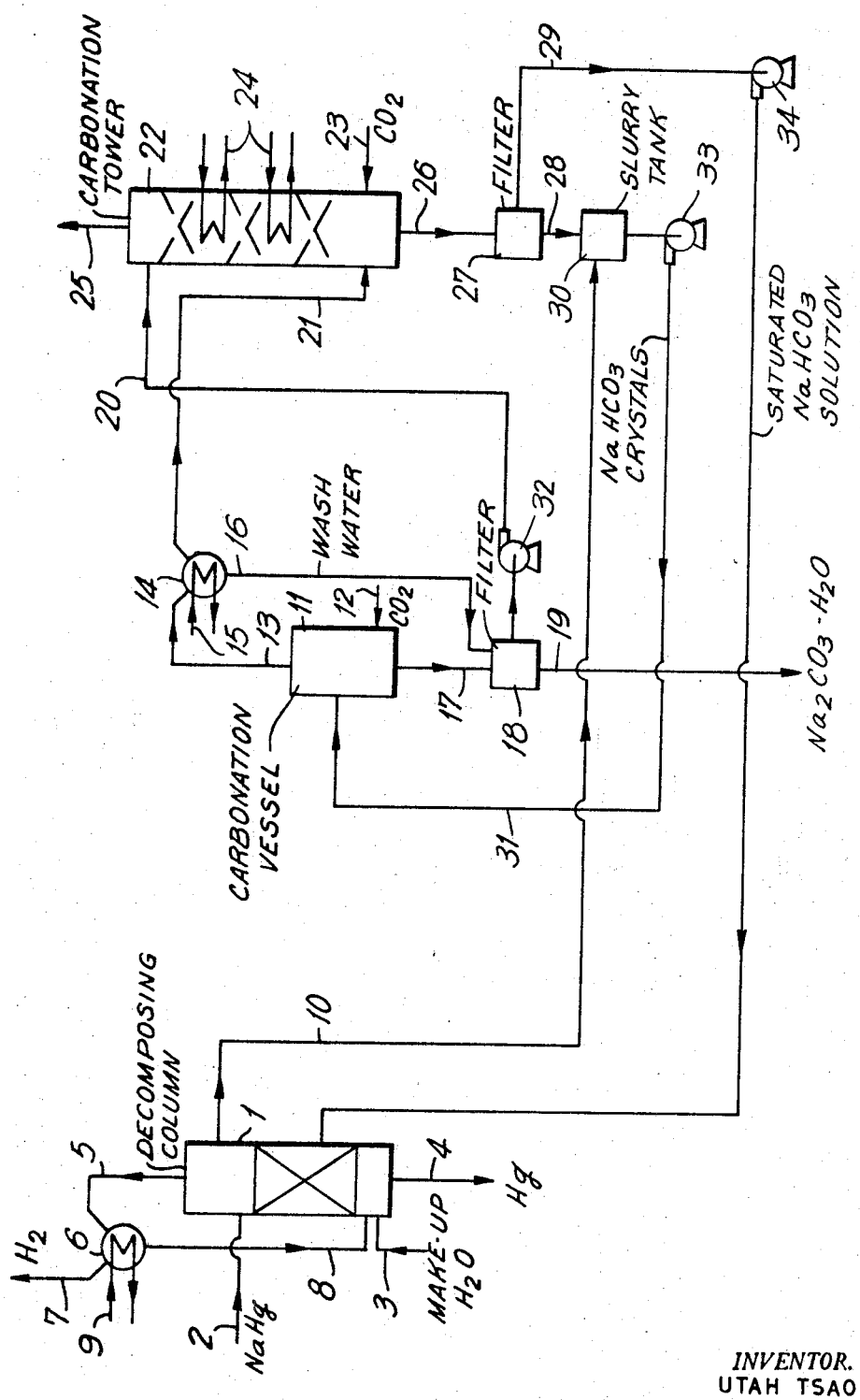
INVENTOR.
UTAH TSAO
BY
ATTORNEY

United States Patent Office 3,551,096
Patented Dec. 29, 1970

3,551,096
PREPARATION OF SODIUM CARBONATE
FROM SODIUM AMALGAM
Utah Tsao, Jersey City, N.J., assignor to The Lummus
Company, Bloomfield, N.J., a corporation of Delaware
Filed Mar. 14, 1968, Ser. No. 713,052
Int. Cl. C01d 7/00
U.S. Cl. 23—63                                    13 Claims

ABSTRACT OF THE DISCLOSURE

A process for producing sodium carbonate from sodium amalgam, water and carbon dioxide by contacting sodium amalgam with water and an aqueous solution of sodium bicarbonate to decompose the amalgam, and form sodium hydroxide, a portion of which reacts with the sodium bicarbonate to form sodium carbonate, the remaining sodium hydroxide being reacted with carbon dioxide and sodium bicarbonate to form sodium carbonate, separating the sodium carbonate thus precipitated, contacting the remaining sodium carbonate solution with carbon dioxide to form sodium bicarbonate, separating the sodium bicarbonate thus precipitated from the saturated aqueous solution thereof and recycling the solution and crystals respectively to the amalgam decomposition step and the step wherein sodium hydroxide is reacted with carbon dioxide.

BACKGROUND OF THE INVENTION

Field of the invention

This invention relates to methods of producing solid sodium carbonate and more particularly to a method of producing the same from sodium amalgam.

The invention also relates to the utilization of sodium amalgam commonly produced in the electrolysis of brine in a new and useful manner.

The invention further relates to apparatus for treating sodium amalgam to produce sodium carbonate.

Description of the prior art

Several processes are known in which sodium amalgam is produced. In the past, attempts have been made to utilize this sodium amalgam. One conventional use for sodium amalgam has been as a starting material for the production of caustic soda by reacting the amalgam with water to form caustic soda and free mercury. For example, U.S. Patents 2,336,045; 2,970,095; 2,949,412; 2,836,551; 3,091,579 and 3,310,482 all disclose reacting sodium amalgam with water to form the above-said products. Generally these processes utilize sodium amalgam formed during the electrolysis of brine from which chlorine is produced.

In recent years, however, the demand for chlorine has increased at a greater rate than that of caustic soda with the result that large, relatively unusable excesses of caustic soda are produced.

As a result, there has developed an interest in utilizing the excess caustic soda and there have been some attempts at using the same as a starting material for various processes. For example, U.S. Pat. 3,179,579 teaches an electrolytic method of producing chlorine and alkali metal carbonates from brine, that is the sodium metal produced by the electrolysis is converted to caustic soda which is then used to produce the corresponding carbonates through an intermediate sesquicarbonate.

Ordinarily, sodium carbonate is produced by the carbonation of sodium hydroxide and there is obtained an aqueous solution of sodium carbonate from which the solid product is isolated. Such a method is disadvantageous in the following respects:

(1) Since sodium carbonate is readily soluble in water, it is necessary to evaporate much of the water in order to obtain a sufficiently high yield of solid sodium carbonate. This evaporation step necessarily involves the expenditure of large amounts of energy and is therefore uneconomical.

(2) The carbonation must be carefully controlled in order to avoid over-carbonation which produces sodium bicarbonate. Sodium bicarbonate being much less soluble than sodium carbonate, any such bicarbonate produced by over-carbonation will tend to precipitate out and contaminate the more soluble carbonate. The present invention provides a process for producing sodium carbonate which overcomes these disadvantages.

SUMMARY OF THE INVENTION

It is an object of the present invention to provide an improved use of sodium amalgam produced in various processes, for example, the electrolysis of brine. It is a further object of this invention to provide an economical process for the production of sodium carbonate. A still further object of this invention is to provide a process for producing sodium carbonate from sodium amalgam.

Advantages of the present invention are that the need for an evaporation system (with its attendant utility requirements) and the necessity for avoiding over-carbonation are eliminated. As will be described in greater detail below, only a portion of the formed sodium carbonate is removed from the system as end-product; the sodium carbonate remaining in solution is further carbonated to sodium bicarbonate which is then recycled to earlier stages of the process. By this further processing of dissolved sodium carbonate, as opposed to isolating same, the need for an evaporation system is avoided. In addition, since the dissolved sodium carbonate is further carbonated to bicarbonate, there is obviously no need to prevent over-carbonation. If any over-carbonation does occur during the initial carbonation step, the produced bicarbonate is merely brought to the next succeeding step wherein dissolved carbonate is converted to bicarbonate.

Yet another object of this invention is to provide improved apparatus for the production of sodium carbonate. These and still further objects will become apparent from the detailed description of this invention which is given below.

To produce sodium carbonate in accordance with the invention, a sodium amalgam produced, for example, in a mercury cell is conducted to a decomposing column where it is contacted countercurrently first with a rising recycle stream of sodium bicarbonate solution and then with water. The water consists of make-up water and the condensed portion of the condensate carried off from the decomposing column together with hydrogen gas liberated by the reaction between sodium and water. In the decomposing column, the following reactions occur:

(1) 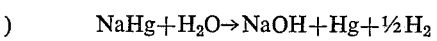  $NaHg + H_2O \rightarrow NaOH + Hg + \frac{1}{2}H_2$ (2)   $NaOH + NaHCO_3 \rightarrow Na_2CO_3 + H_2O$ Reaction 1 is quantitative since an excess of water is used and Reaction 2 proceeds only partially since the rising recycle stream of sodium bicarbonate contains far less than the stoichiometric amount of bicarbonate. The hydrogen gas and mercury may be recovered for use as such, or the mercury may be returned to an adjoining plant for reuse in electrolyzing brine. The solution leaving the decomposing column contains sodium hydroxide and sodium carbonate and is conducted to a carbonation vessel. Prior to the entry of the aforesaid solution into the carbonation vessel, there is mixed with the solution a recycle stream of sodium bicarbonate crystals. Upon mixing the solution and the crystals, a portion of the sodium bicarbonate is converted to sodium carbonate according to Reaction 2 above. The thusly mixed solution and recycle stream of crystals are contacted in the carbonation vessel with carbon dioxide to cause the following reaction to occur:

(3) $\quad 2NaOH + CO_2 \rightarrow Na_2CO_3 + H_2O$

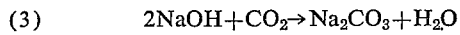

Reaction 3 proceeds to completion, i.e., all of the sodium hydroxide is converted to sodium carbonate. The product of Reaction 3 is an aqueous slurry of sodium carbonate which is separated by suitable means such as filtration, decantation or the like into a solid phase comprising the end product sodium carbonate, obtained as the monohydrate thereof. The mother liquor, or solution, phase, contains a substantial amount of sodium carbonate which is only, with difficulty, recoverable as such and in order to provide a commercially feasible process, said sodium carbonate in the solution must either be recovered or further used. If the solution phase were to be concentrated for the purpose of separating further sodium carbonate therefrom, large amounts of heat would be required. According to the invention, the solution phase containing sodium carbonate is conducted to a carbonation tower together with wash water from the filtration or decantation step. The solution phase is then further carbonated with carbon dioxide to form sodium bicarbonate according to the following reaction.

(4) $\quad Na_2CO_3 + CO_2 + H_2O \rightarrow 2NaHCO_3$

The sodium bicarbonate formed by Reaction 4 is then divided into first and second phases by filtration, decantation, centrifugation, or the like. The first phase is a saturated solution of sodium bicarbonate and the second phase comprises sodium bicarbonate crystals. The first, or solution phase, is the rising recycle stream which countercurrently contacts the sodium amalgam in the decomposing column, and the second, or concentrated phase is the crystals which are contacted and mixed with the solution of sodium hydroxide and sodium carbonate prior to carbonation of the sodium hydroxide solution in the carbonation vessel.

By the above-described process, wherein a portion of the formed sodium carbonate is further carbonated to sodium bicarbonate which is then divided and recycled to separate stages of the process, there is provided an economical use for sodium amalgam and an economically feasible process for the production of sodium carbonate. There is also provided an improved apparatus for the utilization of sodium amalgam in the production of sodium carbonate. There has also been solved by this process certain of the problems inherent in prior art methods which have been heretofore described.

BRIEF DESCRIPTION OF THE DRAWING

The drawing is a diagrammatic illustration of the apparatus and process of the invention.

DETAILED DESCRIPTION OF THE INVENTION

In the drawing, a sodium amalgam is conducted to the upper portion of a graphite packed decomposing column 1 by conduit 2 where the amalgam is at first contacted countercurrently with a rising recycle stream of sodium bicarbonate solution fed to the decomposing column by conduit 29 coming from filter 27. Thereafter, the sodium amalgam is contacted countercurrently with fresh water added by conduit 3 and recycle water added by conduit 8. In the decomposing column, the sodium amalgam by the action of water is converted to mercury which is removed therefrom by conduit 4, sodium hydroxide and hydrogen. The heat of this reaction causes the water to vaporize and the vaporized water together with hydrogen is carried from the top of the decomposing column via conduit 5 from whence it is transported to condensing means 6 which is cooled by cold water coursing through cooling element 9. The water is condensed in condensing means 6 and is recycled via conduit 8. The hydrogen remains gaseous and is removed via conduit 7.

The sodium hydroxide in the decomposing column is partly converted to sodium carbonate by reaction with the rising recycle stream of sodium bicarbonate. The effluent from the decomposing column containing sodium hydroxide, sodium carbonate and water is fed via conduit 10 to slurry tank 30, which also receives sodium bicarbonate crystals through conduit 28 from filter 27. In slurry tank 30 there is formed a slurry of sodium bicarbonate crystals in the effluent. The thus formed slurry is pumped from slurry tank 30 to carbonation vessel 11 through conduit 31 by means of pump 33. The material entering carbonation vessel 11 through conduit 31 comprises sodium hydroxide, sodium carbonate, water and sodium bicarbonate. Upon mixing of the above-mentioned material, a portion of the sodium bicarbonate is converted to sodium carbonate. There is, at the same time introduced into carbonation vessel 11, carbon dioxide via conduit 12. In the carbonation vessel 11, the carbon dioxide reacts with the aforesaid material to convert all the remaining sodium hydroxide to sodium carbonate.

The heat of reaction produced in carbonation vessel 11 causes a portion of the water to be vaporized and the thusly vaporized water together with a portion of the carbon dioxide is carried from the top of the carbonation vessel via conduit 13 to condensing means 14 which is cooled by cold water coursing through cooling element 15. The water is condensed in condensing means 14 and is carried via conduit 16 to separating means 18. The sodium carbonate produced in the carbonation vessel is an aqueous slurry thereof and is carried by conduit 17 to separating means 18, where it is washed by the water brought thereto by conduit 16.

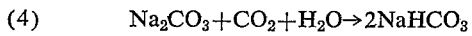

The slurry of sodium carbonate is separated by separating means 18 into a solid phase which is the end product sodium carbonate and which is removed from separating means 18 by conduit 19. The mother liquor or solution phase obtained by the abovesaid separation in separation means 18 is conducted via conduit 20 and pump 32 to the top of carbonation tower 22, which is provided with internal cooling means 24. There is simultaneously introduced into the bottom of carbonation tower 22 carbon dioxide. The carbon dioxide is provided via conduit 23 and via conduit 21, said conduit 21 providing carbon dioxide from condensing means 14. In carbonation tower 22, the mother liquor or solution phase containing sodium carbonate is further carbonated to sodium bicarbonate. The thusly formed sodium bicarbonate is conducted through conduit 26 to separating means 27, where it is divided into solid and solution phases. The solution phase is saturated with sodium bicarbonate and is recycled by conduit 29 and pump 34 to decomposing column 1. The solid phase comprises sodium bicarbonate crystals and is conducted by conduit 28 to slurry tank 30 where it is contacted by the effluent from decomposer 1 passing through conduit 10. Unreacted carbon dioxide from carbonation tower 22 is discharged via conduit 26.

By way of example, a sodium amalgam comprising 46 parts by weight (all parts hereinfater given are by weight) of sodium and 9200 parts of mercury at a temperature of 150–175° F. is conducted to the upper portion of a graphite packed decomposing column 1, by means of conduit 2, where the amalgam is at first contacted countercurrently with a rising recycle stream of 12 parts of sodium bicarbonate in 103.9 parts of water at about 100° F. fed to the decomposing column by conduit 29 coming from filter 27. Thereafter the sodium amalgam is contacted countercurrently with 42 parts of fresh water at a temperature of about 50–120° F. added by conduit 3 and 40 parts of recycle water at about 100–120° F. added by conduit 8.

In the decomposing column, the sodium amalgam, by the action of water, is converted to sodium hydroxide, hydrogen and mercury, the latter being removed therefrom at about 220° F. by conduit 4. The heat of this reaction causes the water to vaporize and the vaporized water, together with 2 parts of hydrogen, is carried from the top of the decomposing column via conduit 5 from whence it is transported to condensing means 6 which is cooled by cold water coursing through cooling element 9. The water is condensed in condensing means 6 and 40 parts thereof are recycled via conduit 8. The hydrogen remains gaseous and is removed via conduit 7.

The sodium hydroxide in the decomposing column is partly converted to sodium carbonate by reaction with the rising recycle stream of sodium bicarbonate. The effluent from the decomposing column at a temperature of about 230° F. contains 74.3 parts of sodium hydroxide, 15.1 parts of sodium carbonate, and 112.5 parts of water, and said effluent is fed via conduit 10 to slurry tank 30 which also receives sodium bicarbonate crystals (72 parts in 4 parts of water) through conduit 28 from filter 27. In slurry tank 30, the effluent and the sodium bicarbonate crystals are mixed to form a slurry of sodium bicarbonate crystals in the effluent. The slurry is pumped from slurry tank 30 through conduit 31 by means of pump 33 to carbonation vessel 11, which vessel is maintained at a temperature of 230–240° F. and a pressure of 5–10 p.s.i.g. The combined material entering carbonation vessel 11 via conduit 31 comprises sodium hydroxide (74.3 parts), sodium carbonate (15.1 parts), water (116.5 parts) and sodium bicarbonate (72 parts). Upon mixing the above-mentioned material, a portion of the sodium bicarbonate is converted to sodium carbonate. There is at the same time introduced into carbonation vessel 11, 22 parts of carbon dioxide at a temperature of 60–150° F., via conduit 12.

In carbonation vessel 11, the carbon dioxide reacts with the aforesaid material to convert all the remaining sodium hydroxide to sodium carbonate. The heat of reaction produced in carbonation vessel 11 causes a portion of the water to be vaporized and the thusly vaporized water together with a portion of the carbon dioxide is carried from the top of carbonation vessel 11 via conduit 13 to condensing means 14 which is cooled by cold water coursing through cooling element 15. The water is condensed in condensing means 14 and 22 parts thereof at a temperature of 150–200° F. are carried via conduit 16 to filter 18 as wash water.

In carbonation vessel 11, there is produced a slurry of sodium carbonate in a concentrated solution of sodium carbonate, comprising 124 parts of crystalline sodium carbonate monohydrate and 153.9 parts of solution which is carried by conduit 17 to filter 18, where the monohydrate crystals are separated from the solution and washed with the wash water brought thereto by conduit 16.

The end product comprising 124 parts of sodium carbonate moonhydrate and 6 parts of water is discharged from filter 18 by conduit 19.

The mother liquor or solution phase obtained by the above-said separation in filter 18 comprises 53 parts of sodium carbonate in 116.9 parts of water at a temperature of 220–225° F., which is conducted via conduit 20 and pump 32 to the top of carbonation tower 22 which is operated at near atmospheric pressure and about 100° F. Carbonation tower 22 is cooled by internal cooling means 24.

There is simultaneously introduced into the bottom of carbonation tower 22 carbon dioxide (22 parts) at a temperature of 60–150° F. The carbon dioxide is provided via conduit 23 and via conduit 21, said conduit 21 providing a relatively minor portion of the carbon dioxide, from condensing means 14. In carbonation tower 22, the mother liquor or solution phase is further carbonated to sodium bicarbonate. Since the solubility of sodium bicarbonate is much lower than that of sodium carbonate, 72 parts of sodium bicarbonate crystals precipitate out of 119.9 parts of the solution, resulting in a slurry. The slurry is conducted at a temperature of about 100° F. through conduit 26 to filter 27, where the crystals are separated from the solution. The solution is recycled by conduit 29 and pump 34 to decomposing column 1. The sodium bicarbonate crystals are discharged from filter 27 through conduit 28 into slurry tank 30 where the solution coming from conduit 10 is used to slurry the crystals which are then carried to carbonation vessel 11 by means of conduit 31 and pump 33, as described above. A minor amount of unreacted carbon dioxide from carbonation tower 22 is discharged via conduit 25.

What is claimed is:
1. A process for producing sodium carbonate from a sodium amalgam, comprising
   (a) contacting a sodium amalgam with an aqueous solution of sodium bicarbonate and water to produce mercury and an aqueous solution of sodium hydroxide and sodium carbonate, and separating the mercury,
   (b) contacting said solution of sodium hydroxide and sodium carbonate with sodium bicarbonate solids and then with carbon dioxide to produce additional sodium carbonate from the sodium hydroxide, and
   (c) recovering sodium carbonate in the monohydrate form.

2. A process according to claim 1, further comprising dividing the sodium carbonate produced in steps (a) and (b) into two portions, recovering one portion in the form of sodium carbonate monohydrate and reacting the other portion with carbon dioxide to produce sodium bicarbonate, separating the sodium bicarbonate thus formed into an aqueous solution thereof and solids, thereof, recycling the said solution to step (a) and recycling the solids to step (b).

3. A process according to claim 2 wherein the sodium bicarbonate solution utilized in step (a) is a saturated solution.

4. A process according to claim 1 wherein step (a) is effected by countercurrently contacting the amalgam first with the aqueous solution of sodium bicarbonate and then with water.

5. A process according to claim 4 wherein step (a) is effected at an elevated temperature.

6. A process according to claim 1 wherein step (b) is effected at elevated temperature.

7. A process according to claim 6 wherein step (b) is effected at a temperature of 230–240° F. and a pressure of 5–10 p.s.i.g.

8. A process for producing sodium carbonate from a sodium amalgam, comprising
   (a) contacting a sodium amalgam with an aqueous solution of sodium bicarbonate and water to produce mercury and an aqueous solution of sodium hydroxide and sodium carbonate, and separating the mercury,
   (b) contacting said solution of sodium hydroxide and sodium carbonate with sodium bicarbonate solids and then with carbon dioxide to produce additional sodium carbonate from the sodium hydroxide,
   (c) separating the sodium carbonate into an aqueous solution thereof and sodium carbonate monohydrate crystals,
   (d) recovering the said monohydrate crystals as product,
   (e) contacting the aqueous solution from step (c) with carbon dioxide to produce sodium bicarbonate,
   (f) separating the sodium bicarbonate into an aqueous solution thereof and solids thereof,
   (g) recycling the sodium bicarbonate aqueous solution to a step (a), and
   (h) recycling the sodium bicarbonate solids to step (b).

9. A process according to claim 8 wherein the sodium bicarbonate solution utilized in step (a) is a saturated solution.

10. A process according to claim 8 wherein step (a) is effected by countercurrently contacting the amalgam first with the aqueous solution of sodium bicarbonate and then with the water.

11. A process according to claim 10 wherein step (a) is effected at an elevated temperature.

12. A process according to claim 10 wherein step (b) is effected at an elevated temperature.

13. A process according to claim 12 wherein step (b) is effected at a temperature of 230–240° F. and a pressure of 5–10 p.s.i.g.

References Cited

UNITED STATES PATENTS

| | | | |
|---|---|---|---|
| 2,336,045 | 12/1943 | Taylor | 204—72 |
| 2,842,489 | 7/1958 | Svanoe | 204—87 |
| 3,103,413 | 9/1963 | Blumenthal | 23—63 |
| 3,179,579 | 4/1965 | Heinemann et al. | 204—98X |

OSCAR R. VERTIZ, Primary Examiner

G. T. OZAKI, Assistant Examiner

U.S. Cl. X.R.

23—184; 75—81, 121